US006881519B2

(12) United States Patent
Bäuerlein

(10) Patent No.: US 6,881,519 B2
(45) Date of Patent: Apr. 19, 2005

(54) NI/METAL HYDRIDE SECONDARY ELEMENT

(75) Inventor: Peter Bäuerlein, Lindwedel (DE)

(73) Assignee: Varta Automotive Systems GmbH (DE)

(*) Notice: Subject to any disclaimer, the term of this patent is extended or adjusted under 35 U.S.C. 154(b) by 0 days.

(21) Appl. No.: 09/909,497

(22) Filed: Jul. 20, 2001

(65) Prior Publication Data

US 2002/0039682 A1 Apr. 4, 2002

(30) Foreign Application Priority Data

Aug. 16, 2000 (DE) .......................................... 100 39 833

(51) Int. Cl.$^7$ .............................................. H01M 4/58
(52) U.S. Cl. ....................... 429/223; 429/209; 429/218.1
(58) Field of Search ............................ 429/209, 218.1, 429/223

(56) References Cited

U.S. PATENT DOCUMENTS 5,827,494 A * 10/1998 Yano et al. .................. 423/594
6,225,004 B1 * 5/2001 Hayashi ....................... 429/223
6,329,101 B1 * 12/2001 Kawakami ................ 429/218.2

FOREIGN PATENT DOCUMENTS

| EP | 0 727 835 A | 8/1996 |
| EP | 0 587 973 B1 | 4/1997 |
| EP | 0 834 945 A1 | 4/1998 |
| EP | 0 867 959 A2 | 9/1998 |
| EP | 0 923 146 A1 | 6/1999 |
| JP | 09 204930 A | 8/1997 |

OTHER PUBLICATIONS

David Linden, "Handbook of Batteries," second edition, McGraw-Hill, Inc., 1994.*

D.H. Buss et al., *The Electrochemical Properties of the Intercalation Compounds Cobalt Hydroxide–Aluminium Hydroxide and Nickel Hydroxide–Aluminium Hydroxide*, J. Chem. Soc., Chem. Commun., 1985, pp 81–82.

Patrick Bernard, *Effects on the Positive Electrode of the Corrosion of $AB_5$ Alloys in Nickel–Metal–Hydride Batteries*, J. Electrochem. Soc., vol. 145, No. 2, Feb. 1998, pp 456–458.

* cited by examiner

Primary Examiner—Dah-Wei Yuan
(74) Attorney, Agent, or Firm—Foley & Lardner LLP

(57) ABSTRACT

A Ni/metal hydride secondary element having a positive nickel hydroxide electrode, a negative electrode having a hydrogen storage alloy, and an alkaline electrolyte, the positive electrode, provided with a three-dimensional metallic conductive structure, also contains an aluminum compound which is soluble in the electrolyte, in addition to nickel hydroxide and cobalt oxide. The aluminum compound is aluminum hydroxide and/or aluminum oxide, and the mass of the aluminum compound which is present in the positive bulk material mixture is 0.1 to 2% by weight relative to the mass of the nickel hydroxide which is present. In combination with aluminum hydroxide or aluminum oxide, the positive electrode further contains lanthanoid oxidic compounds $Y_2O_3$, $La_2O_3$ and $Ca(OH)_2$, as well as mixtures of these compounds.

12 Claims, 3 Drawing Sheets

NI/METAL HYDRIDE SECONDARY ELEMENT

The Government of the United States of America has rights in this invention pursuant to cooperative Agreement No. DE-F CO2-95EE 50425 awarded by the U.S. Department of Energy.

FIELD OF THE INVENTION

This invention relates to batteries, particularly to a Ni/metal hydride secondary element having a positive nickel hydroxide electrode, a negative electrode which contains a hydrogen storage alloy, and an alkaline electrolyte.

BACKGROUND

Nickel hydroxide ($Ni(OH)_2$) represents the electrochemically active material of the positive electrode in nickel cadmium and nickel metal hydride batteries.

Since bivalent nickel hydroxide does not conduct electrons, conductive agents in powder form are generally added. Thus, when the bulk material mixture is compressed, a three-dimensional conductive structure is formed which binds the nickel hydroxide particles with regard to electrons. In bulk material electrodes such as those used in button cells, fine nickel powder is added to the nickel hydroxide to obtain a conductive bulk material.

In the past, graphite was used as the conductive agent in Ni/Cd cells. However, it was susceptible to destruction by oxidation. In electrodes with a metal foam structure, the nickel foam is used as the conductive structure, with its pores being filled with an aqueous suspension which contains nickel hydroxide. Cobalt compounds in the form of CoO, $Co(OH)_2$ or metallic cobalt are added to the positive bulk material to form a fine conductive structure which covers the particles like a network. These compounds are soluble in the electrolyte and, when the cell is first charged, are changed to CoOOH, which conducts electrons and binds the $Ni(OH)_2$ particles in the desired manner.

To make it possible to charge the positive electrode, the potential layers of the oxidation of the $Ni(OH)_2$ to form NiOOH (charging reaction) and the development of oxygen are important:

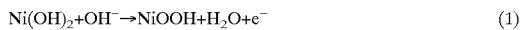
(1)

(2)

A certain amount of overvoltage is required for each of the redox processes (1) and (2) mentioned above, and this varies with temperature, like the position of the respective redox potentials. Inadequate charge absorption occurs in particular at increased charging temperatures and low charging currents since a considerable proportion of the amount of charge supplied is consumed for oxidation of the hydroxide ions. The positive electrode can no longer be fully charged since the charging voltage required for this purpose cannot be achieved due to the amount of oxygen which will be developed at a potential below the required charging voltage. The capacity of the entire cell also falls with the decrease in the charge of the positive electrode.

It is known from EP 0 867 959 A2 that additives of compounds of the elements yttrium, ytterbium, erbium, indium, antimony, barium, calcium and beryllium lead to an improvement in the amount of charge absorbed at increased charging temperatures.

It is also known from EP 0 923 146 A1 that additives of oxides of the elements yttrium, ytterbium, calcium, titanium, niobium and chromium lead to an increase in the overvoltage for oxygen evolution and, thus, to an improvement in the amount of charge absorbed at increased temperatures.

It is further known from EP 0 587 973 B1 that additives of oxides or hydroxides of the elements yttrium, indium, antimony, barium, calcium and beryllium lead to an improvement in the amount of charge absorbed at increased charging temperatures.

It is still further known from EP 0 834 945 A1 that additives of oxides or hydroxides of the elements from the group of lanthanoids lead to an improvement in the amount of charge absorbed at increased charging temperatures.

It would accordingly be advantageous to provide a positive electrode which absorbs a large amount of charge at increased temperatures, and has a high capacity at increased charging temperatures as well.

SUMMARY OF THE INVENTION

This invention relates to a Ni/metal hydride secondary element including a negative electrode containing a hydrogen storage alloy, an alkaline electrolyte, and a positive electrode formed in a three-dimensional metallic conductive structure and including an aluminum compound soluble in the electrolyte nickel hydroxide and cobalt oxide.

DETAILED DESCRIPTION

Figure 1:
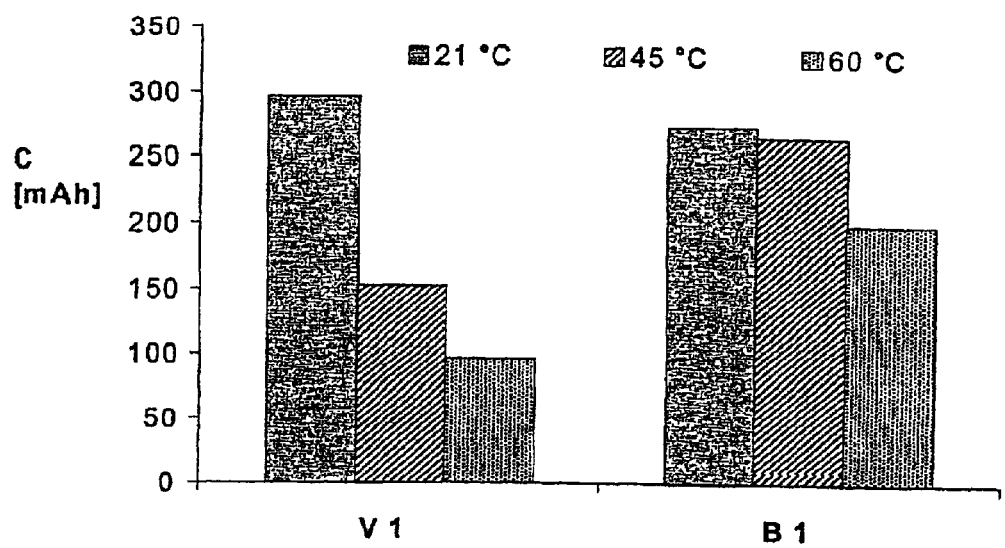
FIG. 1 is a graph of cell capacity (C) of positive bulk compound of the invention in button cells for Example 1 and Comparative Example 1 at three different temperatures.

The amount of charge absorbed by Ni/metal hydride secondary elements at an increased temperature is improved by the addition, according to the invention, of an aluminum compound which is soluble in the electrolyte to the bulk material of the positive electrode. In particular, aluminum hydroxide and/or aluminum oxide in powder form are preferred. These additives can be precipitated by solution/deposition processes in finely distributed form on the positive electrode and/or on the surface of the nickel hydroxide grains. This leads to a modification of the surface and, thus, to an increased overvoltage for $O_2$ evolution, thereby improving the amount of charge absorbed at an increased charging temperature.

Nickel hydroxides doped with aluminum are known. For example, the Journal Chem. Soc. Commun. 1985, pages 81–82, describes a nickel hydroxide doped with aluminum and having the general formula $Ni_{1-x}Al_x(OH)_2X_x$ where $X=NO_3$ and $x=0.2$. The synthesis conditions required for this material are likewise specified. In electrochemical charging/discharging experiments, the material produced in this way has a higher capacity and a higher discharge voltage than pure $Ni(OH)_2$. In this case, Al is an essential component of the nickel hydroxide and, therefore, has to be incorporated in the $Ni(OH)_2$ crystal by a specific synthesis process.

The amount of aluminum incorporated into the crystal is relatively high at 20% by molecular weight, and this is also necessary to achieve an increase in the discharge voltage.

A method for producing $Ni_{1-x}Al_x(OH)_2X_x$ with improved electrochemical characteristics by deposition of a mixture of $Ni(NO_3)_2$ and $Al(NO_3)_3$ is known from DE-B 1 226 671. In this case as well, the aluminum is a component of the nickel hydroxide since it is incorporated in the crystal and replaces nickel lattice positions in the crystal. The material produced using this method is not a mixture of nickel hydroxide and aluminum hydroxide but a real mixed crystal, that is to say, a nickel aluminate.

In the case of such aluminum-doped nickel hydroxides, the aluminum incorporated in the cell occurs in the host lattice of the nickel hydroxide and replaces the nickel lattice positions. It thus changes the structural, chemical and electrochemical characteristics of the nickel hydroxide, which is not the case when an aluminum compound is added according to the invention to the positive bulk material. Furthermore, when aluminum-doped nickel hydroxides are used, the aluminum is not dissolved, or can be dissolved only with extreme difficulty, by the electrolyte from the nickel aluminum hydroxide mixed crystal.

In sharp contrast, the aluminum incorporated according to the invention can be dissolved in the electrolyte. Solubility in the electrolyte is the precondition for the aluminum in the form of its oxide to be distributed by means of a dissolving/deposition processes such that the surface of the positive electrode and/or of the nickel hydroxide particle is modified by a thin, porous and/or ion-conductive film of $Al(OH)_3$ being precipitated on the positive electrode and/or on the nickel hydroxide grain.

The dissolving/deposition dynamics of the aluminum hydroxide are driven by pH changes during charging and discharging. A coating of thin, porous and/or ion-conductive film composed of $Al(OH)_3$ on the surface of the positive electrode and/or on the nickel hydroxide particle can result in an increase in the overvoltage for $O_2$ evolution. At the same time, care must be taken to ensure that the film of $Al(OH)_3$ deposited on the surface of the positive electrode and/or of the nickel hydroxide particle is not too thick, thus making it impossible for charge carriers to pass through, since, otherwise, the charging and discharging reactions will be impeded or prevented. This can be achieved by the use of aluminum hydroxide according to the invention, but not by using aluminum-doped nickel hydroxides.

The Journal Electrochem. Soc. 145, 1998, at pages 456–458, describes the damaging influence of aluminum which enters the electrolyte and, from there, enters the positive electrode by corrosion of the hydrogen storage alloy. This document states that the positive electrode is irreversibly damaged by such Al contamination, which makes itself evident by reduced capacity. Thus, as far as possible, Al compounds should be kept well away from the positive electrode.

However, as a result of the addition of Al compounds in powder form to the positive bulk material, the procedure according to the invention results in a considerable improvement in the electrochemical characteristics of the positive electrode.

The aluminum compound is, in particular, aluminum hydroxide and/or aluminum oxide. The mass of aluminum compounds present in the positive bulk material mixture is about 0.1 to about 2% by weight, preferably about 0.5 to about 1.0% by weight, based on the weight of nickel hydroxide which is present.

In combination with aluminum hydroxide or aluminum oxide, the positive electrode may contain further oxidic compounds from the group of lanthanoids, $Y_2O_3$, $La_2O_3$ and $Ca(OH)_2$, as well as mixtures of these compounds, in which case the content of oxidic compounds which are added in addition to aluminum hydroxide and/or aluminum oxide does not exceed about 9.0% by weight relative to the mass of the nickel hydroxide.

In order to simplify experimental conditions, the suitability of the positive bulk compound according to the invention was investigated using the example of button cells. The negative electrode was a pressed electrode composed of $AB_5$ storage alloy with the composition $LmNi_{3.6}Co_{0.7}Mn_{0.3}Al_{0.4}$, PTFE and carbon black. The positive pressed electrode was composed of spherical $Ni(OH)_2$, 10% CoO, 30% Ni and other additives. So-called standard cells, that is to say cells without any additive, were also tested in each experiment.

The following test procedure was used to determine the amount of charge absorbed:

3 cycles at 21° C.: charging at C/10 up to 150% of the rated capacity; discharging at C/5 down to 0.97 V, 3 cycles at 45° C.: charging at C/10 up to 150% of the rated capacity; discharging at C/5 down to 0.97 V, 3 cycles at 21° C.: charging at C/10 up to 150% of the rated capacity; discharging at C/5 down to 0.97 V, 3 cycles at 60° C.: charging at C/10 up to 150% of the rated capacity; discharging at C/5 down to 0.97 V.

Discharging was carried out at a higher current to keep the self-discharge as low as possible, particularly at 60° C. The amount of charge absorbed was in each case determined at the given temperature in the 3rd cycle.

In order to provide an objective analysis, a number of comparative examples were investigated together with Example 1 of the invention, and in the process it was found to be worthwhile to relate the amount of aluminum compound incorporated in the positive electrode to the amount of nickel hydroxide. This makes it easier to transfer the experience gained with button cells to other cell types, for example, AA cells.

EXAMPLE 1: (BI)

The positive bulk material mixture contained 59.7% spherical nickel hydroxide, 0.3% aluminum hydroxide, 10.0% cobalt oxide and 30.0% nickel powder. The amount of aluminum hydroxide added was thus 0.5% based on the weight of the nickel hydroxide present in the positive mixture.

COMPARATIVE EXAMPLE 1: (V1)

The positive bulk material mixture contained 60.0% spherical nickel hydroxide, 10.0% cobalt oxide and 30.0% nickel powder.

COMPARATIVE EXAMPLE 2: (V2)

The positive bulk material mixture contained 59.0% spherical nickel hydroxide, 1.0% aluminum hydroxide, 10.0% cobalt oxide and 30.0% nickel powder. The amount of aluminum hydroxide added was thus 1.7% by weight of the amount of nickel hydroxide which was present in the positive mixture.

COMPARATIVE EXAMPLE 3: (V3)

The positive bulk material mixture contained 57.0% spherical nickel hydroxide, 3.0% aluminum hydroxide, 10.0% cobalt oxide and 30.0% nickel powder. The amount of aluminum hydroxide added was thus 5.3% by weight of the amount of nickel hydroxide which was present in the positive mixture.

COMPARATIVE EXAMPLE 4: (V4)

The positive bulk material mixture contained 55.0% spherical nickel hydroxide, 5.0% aluminum hydroxide, 10.0% cobalt oxide and 30.0% nickel powder. The amount of aluminum hydroxide added was thus 9.1% by weight of the amount of nickel hydroxide which was present in the positive mixture.

COMPARATIVE EXAMPLE 5: (V5)

The positive bulk material mixture contained 59.7% spherical nickel hydroxide, 0.3% calcium hydroxide, 10.0% cobalt oxide and 30.0% nickel powder. The amount of calcium hydroxide added was thus 0.5% by weight of the amount of nickel hydroxide which was present in the positive mixture.

COMPARATIVE EXAMPLE 6: (V6)

The positive bulk material mixture contained 59.7% spherical nickel hydroxide, 0.3% ytterbium oxide, 10.0% cobalt oxide and 30.0% nickel powder. The amount of ytterbium oxide added was thus 0.5% by weight of the amount of nickel hydroxide which was present in the positive mixture.

The addition of aluminum hydroxide to the positive bulk material according to the invention improves the amount of charge absorbed at an increased temperature as shown in Table 1 and FIG. 1. FIG. 1 in this case shows the influence of the addition of aluminum hydroxide to the positive bulk material as in Example 1 (BI), in comparison to cells without aluminum hydroxide as in Comparative Example 1 (V1), on the cell capacity C.

Measured at 21° C., the additive process according to the invention reduces the cell capacity slightly. At higher charging temperatures of 45° C. and 60° C., the cells with the positive bulk material according to the invention have, as in Example 1, 74% greater capacity than comparative cells without aluminum hydroxide, as in Comparative Example 1. This data can be seen in Table 1 and FIG. 1.

TABLE 1

Influence of the addition of Al(OH)$_3$ on the cell capacity at various charging temperatures

| | $m_{Al(OH)3}/m_{Ni(OH)2}$ | Cell capacity [mAh] | | |
|---|---|---|---|---|
| Example | [%] | 21° C. | 45° C. | 60° C. |
| Comparison 1 (V1) | 0.0 | 296.0 | 153.2 | 96.9 |
| Example 1 (B1) | 0.5 | 274.5 | 265.8 | 200.0 |

Figure 2:
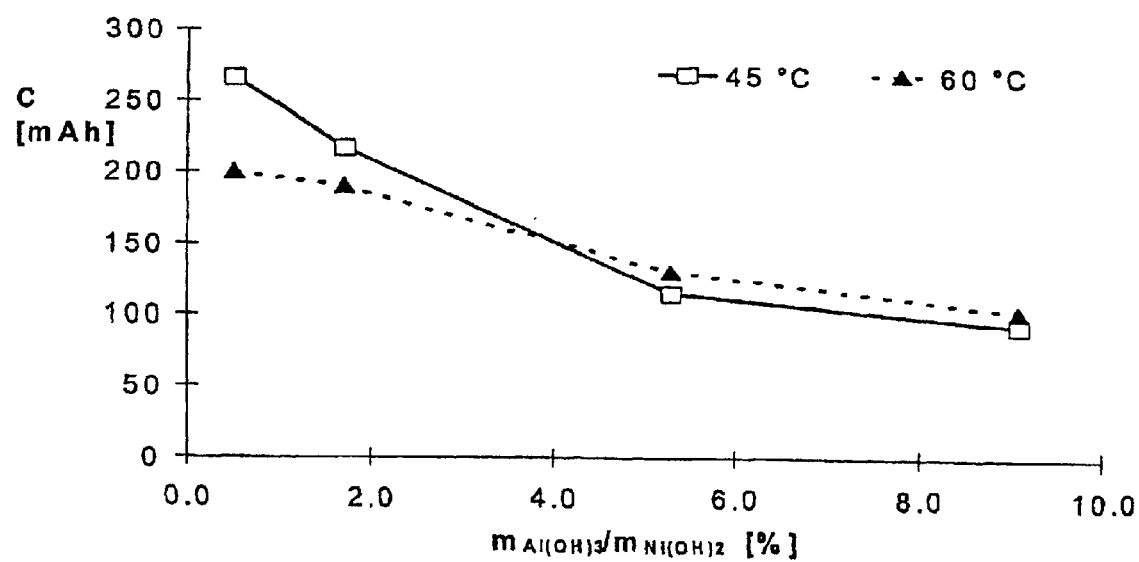
FIG. 2 is a graph of $Al(OH)_3$ content on cell capacity at two temperatures.

However, any further increase in the aluminum hydroxide content of the positive bulk material then leads to reductions in the cell capacity, as shown in Table 2 and FIG. 2. FIG. 2 shows the influence of the Al(OH)$_3$ content on the cell capacity C at various charging temperatures.

TABLE 2

Influence of the Al(OH)$_3$ content on the cell capacity at various charging temperatures

| | $m_{Al(OH)3}/m_{Ni(OH)2}$ | Cell capacity [mAh] | | |
|---|---|---|---|---|
| Example | [%] | 21° C. | 45° C. | 60° C. |
| Example 1 (B1) | 0.5 | 274.5 | 265.8 | 200.0 |
| Comparison 2 (V2) | 1.7 | 213.4 | 216.9 | 190.4 |
| Comparison 3 (V3) | 5.3 | 91.7 | 114.9 | 130.5 |
| Comparison 4 (V4) | 9.1 | 77.8 | 92.7 | 103.0 |

Figure 3:
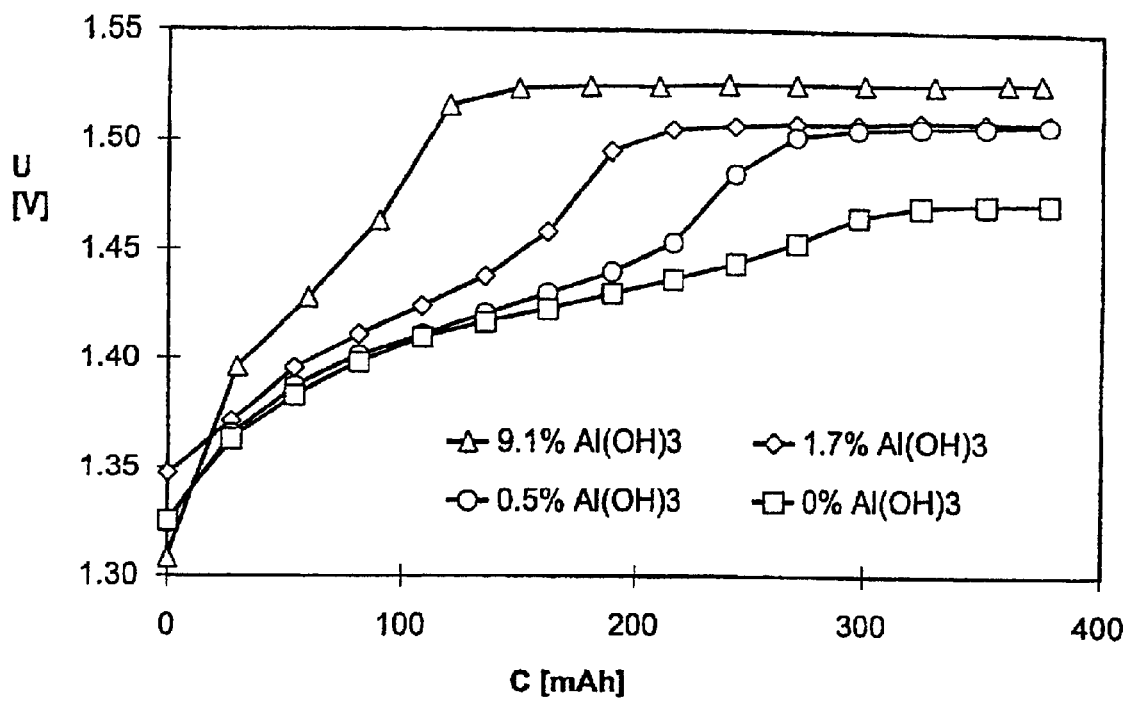
FIG. 3 is a graph of cell capacity v. charging voltage at four levels of $Al(OH)_3$ content.
Figure 4:
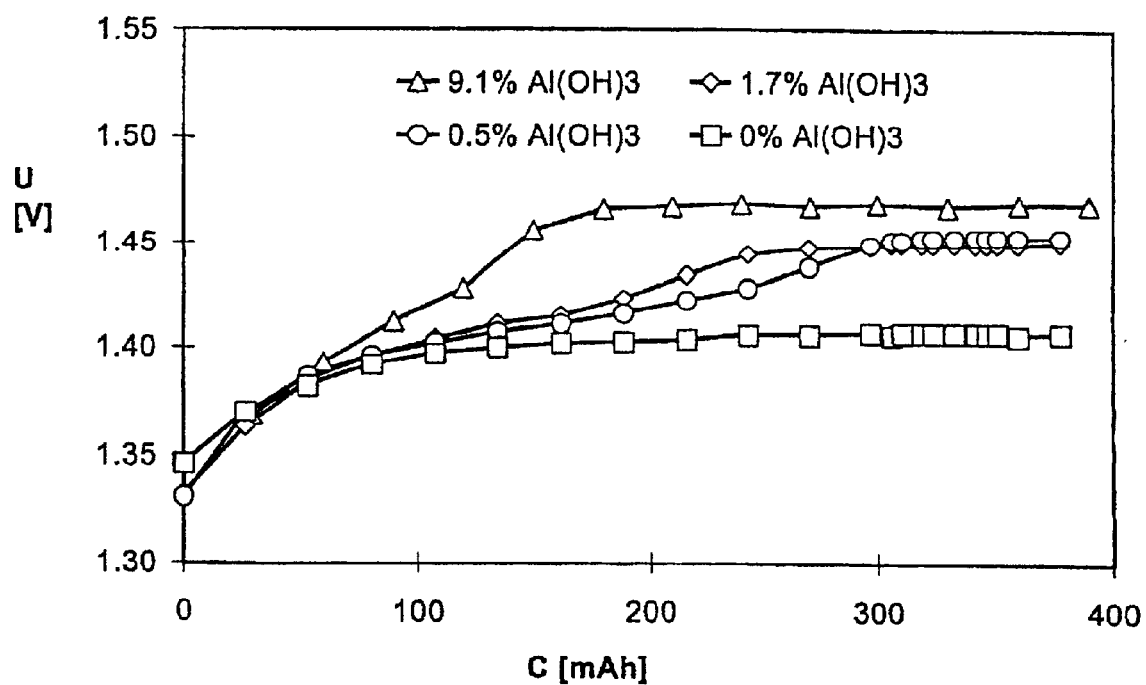
FIG. 4 is a graph of cell capacity v. charging voltage at four levels of $Al(OH)_3$ content.

Al(OH)$_3$ contents above about 1% reduce the cell capacity, with the damaging effect of the aluminum hydroxide outweighing its positive effect. This is probably due to the increase in the O$_2$ overvoltage resulting from modification of the surface of the nickel hydroxide particles, which is, however, overcompensated by the covering or shielding of the surface of the spherical nickel hydroxide. An excessive proportion of aluminum hydroxide could shield the surface of the nickel hydroxide particles and, thus, impede the process of the electrochemical charging and discharging reaction. This can be seen in FIGS. 3 and 4 and in Table 3. FIG. 3 shows the charging voltage curves (U) for cells with different Al(OH)$_3$ contents at a charging temperature of 21° C., 150% rated charge at C/10. FIG. 4 shows the charging voltage curves (U) for cells with various Al(OH)$_3$ contents for a charging temperature of 45° C., 150% rated charge at C/10.

The cell with an Al(OH)$_3$ additive content of 0.5% relative to the mass of nickel hydroxide as in Example 1 has a higher final charging voltage than cells without the addition of aluminum hydroxide as in Comparative Example 1. The Ni$^{+2}$/Ni$^{+3}$ potential is clearly limited to the potential of O$_2$ evolution (Table 3 and FIG. 3). Although the final charging voltage increases as the aluminum hydroxide content increases, the amount of charge which is absorbed by the electrode before reaching the final charging voltage decreases as the aluminum hydroxide content increases.

TABLE 3

Influence of the Al(OH)$_3$ content on the final charging voltage for various charging temperatures

| $m_{Al(OH)3}/m_{Ni(OH)2}$ | Final Charging Voltage | | |
|---|---|---|---|
| [%] | 21° C. | 45° C. | 60° C. |
| 0.0 | 1.468 | 1.404 | 1.364 |
| 0.5 | 1.508 | 1.453 | 1.416 |
| 1.7 | 1.509 | 1.450 | 1.412 |
| 5.3 | 1.517 | 1.461 | 1.425 |
| 9.1 | 1.527 | 1.468 | 1.399 |

As the temperature rises and the proportion of aluminum hydroxide decreases, the final charging voltage decreases. The optimum cell capacity, characterized by the amount of charge absorbed before reaching the final charging voltage, occurs at an aluminum hydroxide content of approximately 0.5% relative to the mass of nickel hydroxide, as in Example 1.

Figure 5:
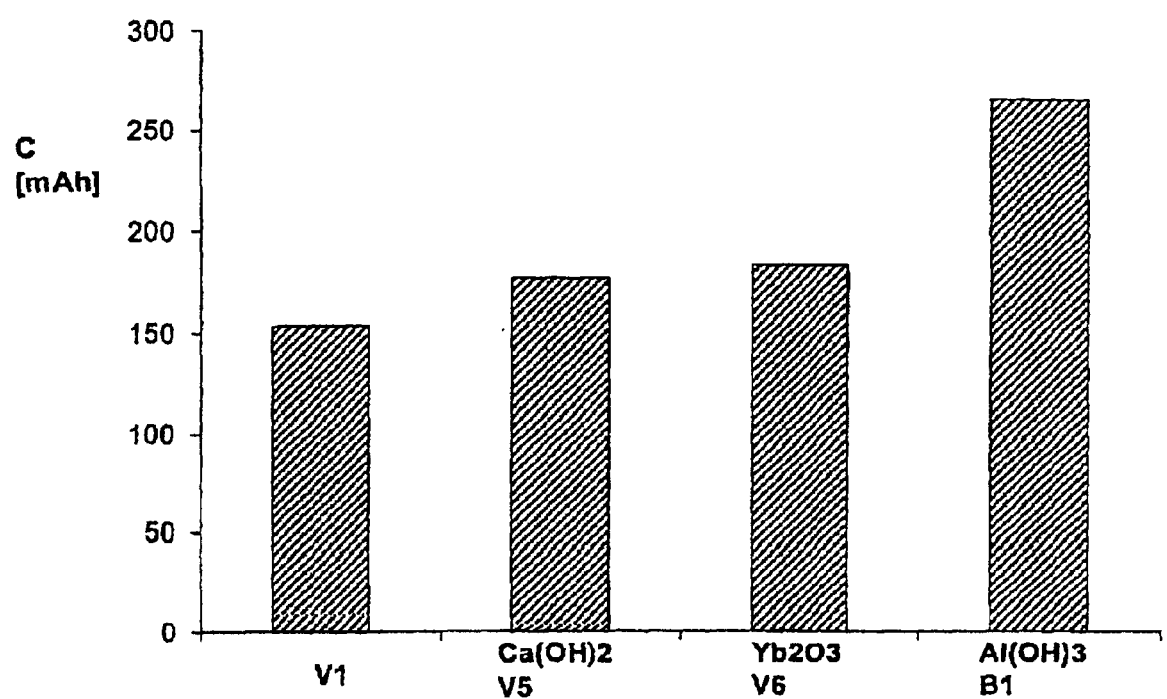
FIG. 5 is a graph of cell capacity of positive bulk compound of the invention in button cells for Example 1 and Comparative Examples 1, 5 and 6 at a changing temperature of 45° C.

In order to show the effects of the addition of aluminum hydroxide according to the invention, comparative cells were produced with calcium hydroxide and ytterbium oxide additive contents. The results are summarized in Table 4 and FIG. 5. FIG. 5 shows the influence of lower amounts of different additives on the cell capacity C at a charging temperature of 45° C.

TABLE 4

Influence of various additives on the cell capacity at various charging temperatures, 150% rated charge at C/10

| Example | Additives | [%] | Cell capacity [mAh] | | |
|---|---|---|---|---|---|
| | | | 21° C. | 45° C. | 60° C. |
| Comparison 1 (V1) | None | 0.0 | 296.0 | 153.2 | 95.9 |
| Comparison 5 (V5) | Ca(OH)$_2$ | 0.5 | 298.4 | 176.0 | 101.4 |
| Comparison 6 (V6) | Yb$_2$O$_3$ | 0.5 | 296.7 | 183.5 | 95.4 |
| Example 1 (B1) | Al(OH)$_3$ | 0.5 | 274.5 | 265.8 | 200.0 |

Compared with the known additives, Ca(OH)$_2$ and Yb$_2$O$_3$, the addition of Al(OH)$_3$ according to the invention has the greatest effect for a small amount of additive overall. The capacity of the cells at a charging temperature of 21° C. is initially approximately 7% less. The cells according to the invention thus have a capacity which is about 45% to about 74% greater at a charging temperature of 45° C.

What is claimed is:

1. A Ni/metal hydride secondary element comprising:
   a negative electrode comprising a hydrogen storage alloy, an alkaline electrolyte, and
   a positive electrode operably connected to the negative electrod by the electrolyte and formed by a bulk material mixture comprising nickel hyroxide, cobalt oxide, and an aluminum compound soluble in the electrolyte,
   wherein the aluminum compound is provided as a coating of Al(OH)$_3$ on the surface of at least one of the positive electrode and the nickel hydroxide such that the aluminum compound becomes dissolved into the electrolyte and modifies surface portions of the positive electrode when the element is charged.

2. The Ni/metal hydride secondary element as claimed in claim 1, wherein the aluminum compound is in the positive electrode in an amount of bout 0.1 to about 2% by weight based on the weight of the nickel hydroxide.

3. The Ni/metal hydride secondary elemen as claimed in claim 1, wherein the aluminum compound is selected from the group consisting of aluminum hydroxide, aluminum oxide, and combinations thereof.

4. The Ni/metal hydride secondary element as claimed in claim 3, wherein the content of the aluminum compound is between about 0.5 and about 1.0% by weight based on the weight of the nickel hydroxide.

5. The Ni/metal hydride secondary element as claimed in claim 1, wherein the positive electrode further comprises an additive selected from the group consisting of lanthanoid oxidic compounds, Y$_2$O$_3$, La$_2$O$_3$, Ca(OH)$_2$ and mixtures thereof.

6. The Ni/metal hydride secondary element as claimed in claim 5, wherein the amount of oxidic compounds does not exceed about 9.0% by weight based on the weight of the nickel hydroxide.

7. An AA battery formed from a Ni/metal hydride element according to claim 1.

8. A button cell formed from a Ni/metal hydride element according to claim 7.

9. A Ni/metal hydride secondary element comprising:
   a negative electrode comprising a hydrogen storage alloy,
   an alkaline electrolyte, and
   a positive electrode operably connected to the negative electrode by the electrolyte and formed by a bulk material comprising a mixture of nickel hydroxide, cobalt oxide, and an aluminum compound selected from the group consisting of aluminum oxide and aluminum hydroxide in powder form, and
   wherein the positive electrode is substantially free of Ca(OH)$_2$ and/or Yb$_2$O$_3$, and wherein the aluminum compound becomes dissolved into the electrolyte and modifies surface portions of the positive electrode when the element is charged.

10. A Ni/metal hydride secondary element comprising:
    a negative electrode comprising a hydrogen storage alloy,
    an alkaline electrolyte, and
    a positive electrode operably connected to the negative electrode by the electrolyte and formed by a bulk material in a three-dimensional metallic conductive structure, the positive electrode comprising within said bulk material an aluminum compound soluble in the electrolyte, nickel hydroxide and cobalt oxide, such that upon charging the element, the aluminum compound dissolves into the electrolyte and forms a thin, porous and/or ion-conductive film of Al(OH)$_3$ on surface portions of the positive electrode.

11. The Ni/metal hydride secondary element as claimed in claim 10, wherein the film has a thickness of about 0.03 $\mu$m to about 0.1 $\mu$m.

12. A method of forming an active positive electrode in a battery containing a negative electrode and an electrolyte comprising:
    mixing nickel hydroxide, cobalt, oxide and a powder of an aluminum compound to form a bulk material;
    forming the bulk material into a three-dimensional metallic conductive structure;
    operably connecting the three-dimensional metallic conductive structure to the negative electrode by contact with the electrolyte;
    causing portions of the aluminum compound to dissolve from the structure into the electrolyte by charging the battery; and
    forming a thin, porous and/or ion-conductive film of Al(OH)$_3$ on the surface portions, thereby activating the positive electrode.

* * * * *

UNITED STATES PATENT AND TRADEMARK OFFICE
CERTIFICATE OF CORRECTION

PATENT NO. : 6,881,519 B2
DATED : April 19, 2005
INVENTOR(S) : Peter Bauerlein

It is certified that error appears in the above-identified patent and that said Letters Patent is hereby corrected as shown below:

Column 7,
Line 28, please replace "electrod" with -- electrode --.
Line 29, please replace "hyroxide" with -- hydroxide --.
Line 40, please replace "bout" with -- about --.
Line 42, please replace "elemen" with -- element --.

Column 8,
Line 42, please delete "," between "cobalt" and "oxide".

Signed and Sealed this

Twelfth Day of July, 2005

JON W. DUDAS
*Director of the United States Patent and Trademark Office*